Jan. 10, 1956  E. L. FISHER ET AL  2,730,350
SPEED REGULATOR
Filed Feb. 2, 1953  2 Sheets-Sheet 1
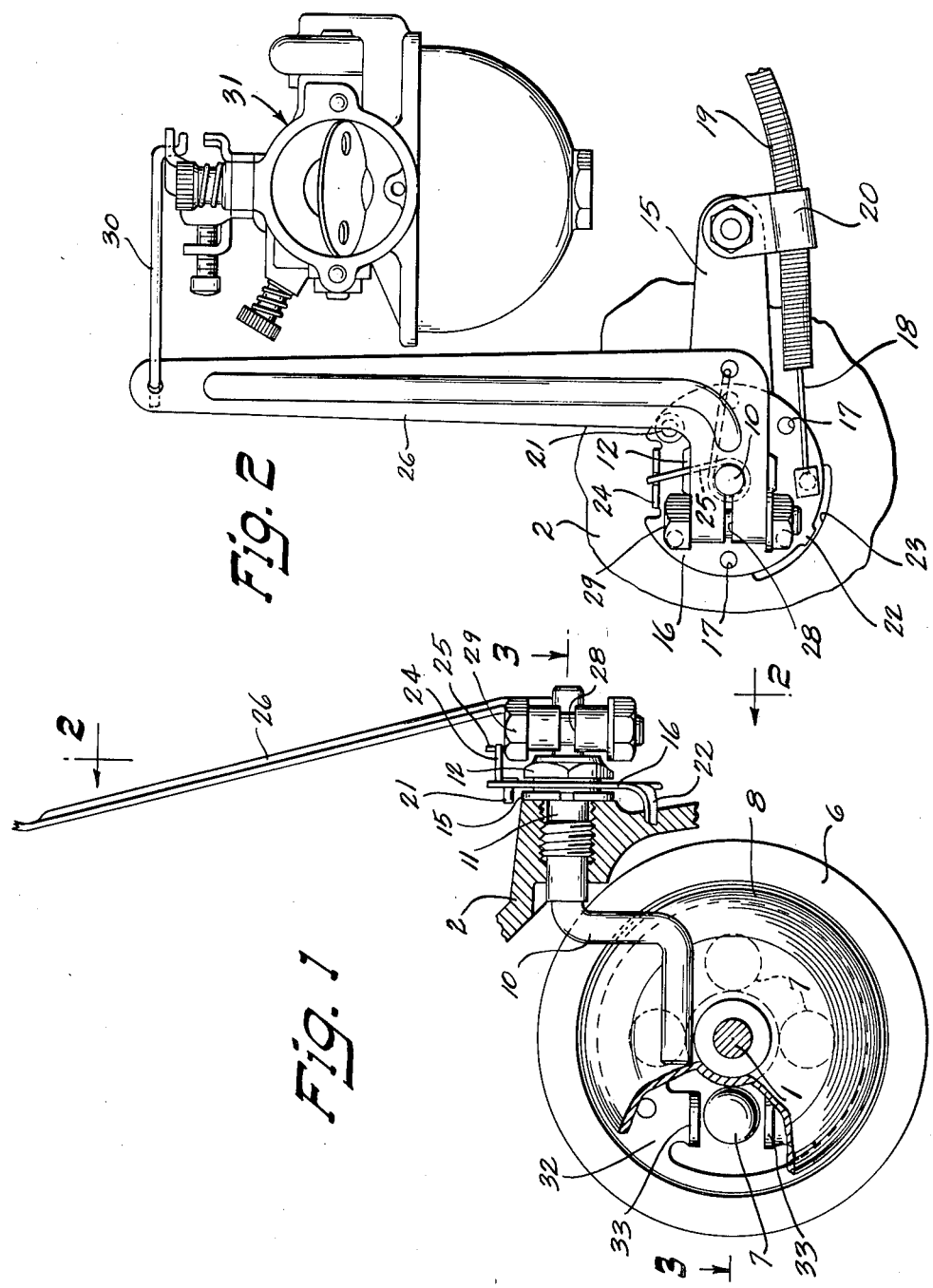
INVENTORS
Edwin L. Fisher
BY Alvin P. Fenton
Arthur H. Seidel
Attorney Jan. 10, 1956     E. L. FISHER ET AL     2,730,350
SPEED REGULATOR
Filed Feb. 2, 1953     2 Sheets-Sheet 2
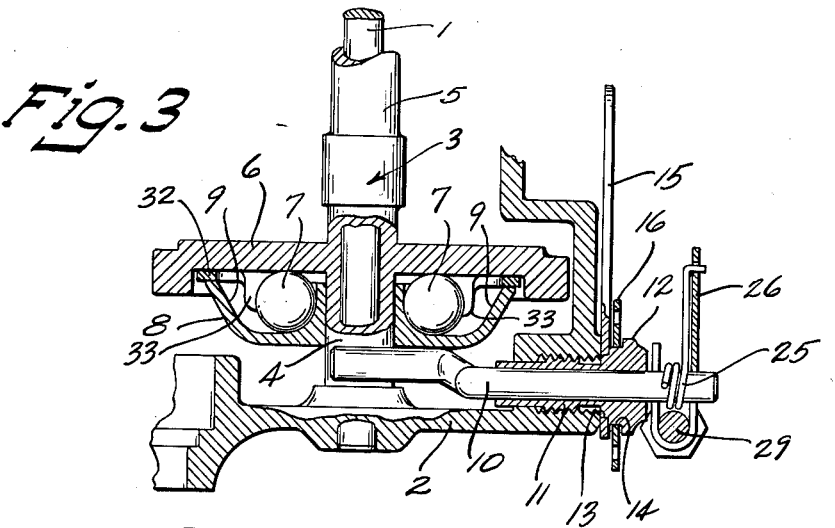
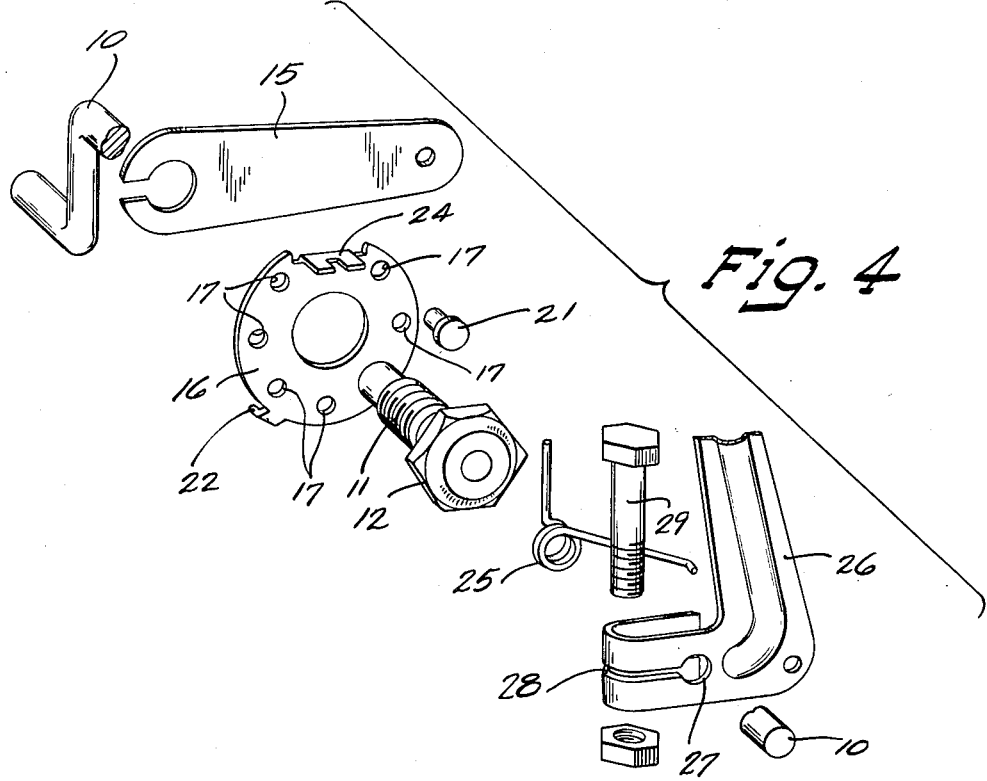
INVENTORS
Edwin L. Fisher
Alvin P. Fenton
BY
Arthur H. Seidel
Attorney United States Patent Office 2,730,350
Patented Jan. 10, 1956

2,730,350

SPEED REGULATOR

Edwin L. Fisher, Sheboygan, and Alvin P. Fenton, Kohler, Wis., assignors to Kohler Co., Kohler, Wis., a corporation of Wisconsin Application February 2, 1953, Serial No. 334,544

10 Claims. (Cl. 264—3)

This invention relates to apparatus for the regulation of the speed of prime movers and more specifically it resides in a governor having centrifugally urged weights which act upon a control shaft that is rotated in response to centrifugally induced movement of the weights which motion is opposed by a torsion spring acting upon the control shaft, the apparatus of the invention including when desired means by which the stress of the spring may be adjusted by shifting its anchored end to increase or decrease the bias acting upon the governor weights to correspondingly alter output speed.

Governor weights have heretofore been biased by spring means joined to linkage members between the governor weights and the throttle or other member to be controlled. For this purpose one end of an extensible or contractible coil spring is attached to a linkage arm to transmit the spring bias through the arm and the governor assembly to urge the governor weights toward the standstill position. The opposite end of the spring usually is attached to a member that may be shifted to increase or decrease the force of the spring acting upon the governor weights.

Further, governors have heretofore been constructed in which the movement of the governor weights imparts rotation to a control shaft upon which a swinging arm which is a part of the linkage is mounted. Usually the extensible or contractible bias spring is attached to this arm. The force of such a spring acts obliquely to the radius arm passing through the point of application of the force for all positions of the linkage arm save one. Consequently, objectionable radial thrusts are exerted by the spring upon the shaft and its bearing. Wear and impairment of accuracy normally follow as a result of such undesirable radial thrusts.

An extensible or contractible spring, as commonly employed, is of substantial length and requires a corresponding space in which to function. The usual governor places the spring in an exposed position and special precautions need to be taken to provide shielding.

It is an object of this invention to provide a governor having a rotatable control shaft responsive to governor weight movement in which the bias spring acting through the shaft and upon the weights does not give rise to any substantial radial thrust acting upon the shaft.

It is another object of this invention to provide a governor having a more compact relation between the bias spring and the control members associated with the spring to protect the spring without resort to special shielding.

It is another object of this invention to provide a governor that will maintain prime mover speed constant with a minimum of hunting.

It is still another object of this invention to provide a governor in which the full range of permissible adjustment by variation of spring-stress can be achieved without material change in the physical location of the spring.

These and other objects and advantages of this invention will appear in the description to follow. In the description reference is made to the accompanying drawings in which there is set forth by way of illustration and not of limitation a specific form in which the invention may be embodied.

Referring now to the drawings:

Fig. 1 is a front view in elevation of a governor in which this invention may be embodied in form suitable for control of an internal combustion engine, portions of the engine frame that support the apparatus being shown broken away, Fig. 2 is a side view in elevation of those portions of the governor shown in Fig. 1, viewed from the plane 2—2, disposed on the exterior of the engine frame together with a carburetor controlled by the governor and connecting linkage therebetween, Fig. 3 is a plan view of the governor shown in Fig. 1 viewed through the plane 3—3, and Fig. 4 is an exploded view in perspective of the elements of the governor which are mounted concentrically upon the control shaft.

Referring now to the drawings, there is shown a stationary mounting shaft 1 that is embedded at one end in the wall of the engine frame 2, as is shown in Fig. 3. The opposite end of the shaft 1, not shown, is similarly secured, thus providing a bearing support for a closely fitting governor shaft in the form of a quill shaft 3 that is rotated at a speed varying directly with the rate of rotation of the engine to be governed. Integrally formed as a part of the quill shaft 3 is a fly ball driving plate 6 that is concentric with and perpendicularly disposed to the axis of the shaft 3. The driving plate 6 divides the quill shaft 3 into a rearwardly disposed cam shaft portion 5 and a forwardly disposed sleeve portion 4 upon which is mounted a thrust collar 8 that is free to slide axially toward and away from the driving plate 6.

Fixed to the face of the driving plate 6 disposed toward the thrust collar 8 is a retainer ring 32 formed from sheet material. The ring 32 has a plurality of ears 33 that extend from the face of the driving plate 6 to form races for a set of free fly balls 7 that are equally spaced angularly about the forward portion 4 of the quill shaft 3. Rotation is imparted to the fly balls 7 by the ears 33 and the races formed by the ears 33 allow radial displacement of the fly balls 7 in response to rotational forces. As shown in Fig. 3, the thrust collar 8 has an annular cavity 9 that receives both the fly balls 7 and the ears 33 of the retainer ring 32 in a fashion to cooperate with the driving plate 6 and ring 32 to retain the fly balls 7 in position. The cavity 9 has an outer sloping face, so that radial outward movement of the fly balls 7, in response to rotational forces, will force the thrust collar 8 axially along the quill shaft 3.

A crank shaped control shaft 10 having its throw disposed against the outer face of the thrust collar 8, is mounted for swinging motion in a bushing 11 threadedly seated in the engine frame 2. A hexagonal head 12 is provided on the bushing 11 to permit it to be tightened down or retracted from the frame 2. A pair of circular steps 13 and 14 are formed in the bushing 11 in front of the head 12 to provide a mounting for a speed adjusting bracket 15 and a speed regulating disc 16 respectively. The bracket 15 includes an extension which forms a lever arm that may be swung freely about the bushing 11 and which may be retained in any desired position by turning the bushing 11 into the frame 2 to clamp the bracket 15 between the side of the frame 2 and the rise between the steps 13 and 14. The regulating disc 16, encircling the ridge 14, is free to rotate with respect to the bushing 11 regardless of whether or not the bushing 11 is brought up tight.

The disc 16 is formed with a number of circumferentially spaced peripheral openings 17 to provide means for engagement with the end of a remote control cable 18, shown in Fig. 2, through which rotation may be imparted to the disc 16. A cable sheath 19 surrounds the cable 18 and is attached by means of a clamp 20 to the outer end of the speed adjusting bracket 15. Permanently fastened in another of the peripheral openings 17 of the disc 16 is a short stud 21 that overhangs the bracket 15 to provide stop means for engagement with the adjustable bracket 15. As will be hereinafter described, the bracket 15 may be adjusted about the bushing 11 in those instances where remote control is not desired, in which case the remote control cable 18 may be dispensed with. To limit the rotation of the disc 16 a finger 22 extending from its periphery may be received within a slot 23 in the engine frame 2.

A slotted ear 24, at the top of the disc 16, is bent to receive the anchored end of a helical torsion spring 25 that is wrapped about the control shaft 10. The opposite end of the spring 25 is fastened to a linkage arm 26 that is mounted on and extends radially from the control shaft 10. As is shown more clearly in Figs. 3 and 4 the bottom of the arm 26, which is turned back on itself, is bored to receive the end of the shaft 10 and slotted at 28 to receive a clamping bolt 29 which tightly clamps the arm 26 to the end of shaft 10. As is shown in Fig. 2, the end of the linkage arm 26 is connected to a link 30 which in turn operates a throttle valve within a carburetor 31.

Spring 25, attached to the arm 26, is placed under stress and applies torque to the control shaft 10 to place a bias on the thrust collar 8, urging the fly balls 7 towards the standstill position close to the forward portion 4 of the quill shaft 3. The torque exerted by the spring 25 arises both from the coiled portion which is in torsion and from the resilient spring arm portions leading from the coiled section to the connections with the disc 16 and linkage arm 26. The torque delivered acts upon the arm 26 in a direction substantially normal to the swinging radius of the point of contact between the arm 26 and spring 25. There is, then, little unwanted radial thrust applied to the shaft 10 and bearing friction and wear between the shaft 10 and bushing 11 are a minimum.

When it is desired to control engine speed from a point remote from the governor the control cable 18 and its sheath 19 are attached as shown in Fig. 2. The bushing 11 is brought up snugly against the speed adjusting bracket 15 to provide a firm anchorage for the sheath 19. With the engine running, the fly balls 7 will be urged outwardly and the thrust collar 8 will move axially against the crank end of the control shaft 10, in opposition to the bias provided by the spring 25. The rotation of the shaft 10 will cause a closing movement of the throttle valve of the carburetor 31. As the engine comes up to speed an equilibrium will occur in the governor mechanism wherein the spring bias and the force exerted through the collar 8 by the fly balls 7 will be equal. Then, if engine speed tends to increase, the corresponding movement of the collar 8 will rotate the shaft 10 to further close the throttle of the carburetor 31, thus limiting engine speed. If, however, engine speed were to decrease, the corresponding decrease of centrifugal force in the fly ball assembly will permit the bias of the spring 25 to move the shaft 10 against the collar 8 to open the carburetor throttle.

To alter the engine speed the remote control cable 18 may be shifted back and forth by a control lever, not shown, at the remote end of the cable 19. The disc 16 may be thus rotated to vary the stress in the spring 25 to increase or decrease the governed speed at which the engine will operate.

In different engine installations the remote control cable 18 may approach the governor from different directions. To provide for convenient attachment of the cable 18 regardless of the direction of approach of the cable 18 the regulating disc 16 is provided with a plurality of peripheral openings 17. That opening 17 most advantageous for connection to the cable 18 is employed and the speed adjusting bracket 15 is swung into position for conveniently mounting the sheath 19.

If desired the remote control cable 18 may be dispensed with and removed. In such case the bias of the spring 25 will cause the disc 16 to move clockwise, as viewed in Fig. 2, until the stud 21 engages the speed adjusting bracket 15 to arrest further movement. Then, to increase governed engine speed the bushing 11 may be backed off to loosen the speed adjusting bracket 15, and the bracket 15 may be swung counterclockwise, as viewed in Fig. 2, to carry the disc 16 in like direction to increase spring bias. To decrease engine speed the bracket 15 is moved in the opposite direction. The stud 21 will rest upon the bracket 15 for each setting and the bushing 11 is brought up tight after the setting is made to secure the bracket 15 in place.

The torsion spring 25 occupies little space and being wrapped about the shaft 10 is disposed in a protected position. Further the full range of adjustment of the spring 25 covering the corresponding range of engine speed may be achieved without material change in the physical location of the spring 25 or parts associated therewith.

We claim:

1. In a governor the combination comprising a governor shaft rotatably driven by a prime mover to be governed, speed responsive governor members displaceable in response to movements of said governor shaft, a rotatably mounted control shaft cooperatively related to said speed responsive members rotated in response to displacement of said members, an arm secured to said control shaft extending radially therefrom for a substantial radial distance, a regulating member adjustably rotatable with respect to said control shaft, a helical torsion spring encircling said shaft having a radially extending end joined to said arm to apply a rotational force through said arm at a substantial radial distance from said shaft to said control shaft resisting displacement thereof by said speed responsive members and secured at the other end to said regulating member whereby rotational displacement of said regulating member about said control shaft alters the stress of said spring, adjustment means including an arm mounted for pivotal movement about said control shaft cooperatively engaging said regulating member to retain said member in a selected position, and a clamping member engageable with the arm of said adjustment means adapted to hold said arm from shifting from a set position.

2. In a governor the combination comprising a governor shaft rotatably driven by a prime mover to be governed, a set of governor weights rotatable with said shaft and radially displaceable in response to centrifugal forces imparted thereto from said shaft, a rotatably mounted control shaft cooperatively engaged with said weights to be rotated in response to radial displacement of said weights, a linkage arm secured to said control shaft extending radially therefrom, a regulating member mounted on and rotatable with respect to said control shaft, a helical torsion spring encircling said control shaft having one end extending outward from said control shaft to a connection with said linkage arm and secured at the other end to said regulating member, adjustment means including an arm mounted for pivotal movement about said control shaft cooperatively engaging said regulating member to retain said member in a selected position whereby said spring is retained in a state of stress, and a clamping member engageable with the arm of said adjustment means adapted to hold said arm from shifting from a set position.

3. In a governor the combination comprising a governor shaft rotatably driven by a prime mover to be governed, governor weights rotatable with said governor shaft and displaceable in response to centrifugal forces imparted thereto from said shaft, a rotatably mounted control shaft cooperatively related to said weights rotated in response to displacement of said weights, a regulating member mounted on and rotatable with respect to said control shaft, a helical torsion spring encircling said control shaft having an end coacting with said control shaft to apply a rotational force thereto resisting displacement thereof by said weights and secured at the other end to said regulating member, an adjusting member mounted on said control shaft engageable with said regulating member to rotate the same about said control shaft against the bias of said torsion spring, and a clamping member releasably clamping said adjusting member in a selected position.

4. In a governor the combination comprising a governor shaft rotatably driven by a prime mover to be governed, governor weights rotatable with said governor shaft and displaceable in response to centrifugal forces, a rotatably mounted control shaft cooperatively related to said weights rotated in response to displacement of said weights, a regulating member mounted on and rotatable with respect to said control shaft, a helical torsion spring encircling said control shaft having an end coacting with said control shaft to apply a rotational force thereto resisting displacement thereof by said weights and secured at the other end to said regulating member, an adjusting member mounted on and rotatable with respect to said control shaft, a clamping member releasably clamping said adjusting member in a selected position, and a remote control cable supported by said adjusting member joined to said regulating member adapted to rotate said regulating member about said control shaft.

5. In a governor the combination comprising a governor shaft driven by a prime mover to be governed, a rotatably mounted control shaft cooperatively related to said governor shaft to be rotated in response to movement of said governor shaft, a regulating member rotatable with respect to said control shaft, an arm extending radially from said control shaft, a torsion spring encircling said control shaft having an end joined with said arm at a substantial radial distance from said control shaft to apply a rotational force thereto resisting displacement thereof by said governor shaft and secured at the other end to said regulating member, an adjusting member rotatable for engagement and swinging movement with said regulating member to rotate the same against the bias of said torsion spring, and a clamping member releasably clamping said adjusting member in a selected position.

6. In a governor the combination comprising a governor shaft driven by a prime mover to be governed, a rotatably mounted control shaft cooperatively related to said governor shaft to be rotated in response to movement of said governor shaft, a regulating member rotatable with respect to said control shaft, an arm extending radially from said control shaft, a torsion spring encircling said control shaft having an end joined with said arm at a substantial radial distance from said control shaft to apply a rotational force thereto resisting displacement thereof by said governor shaft and secured at the other end to said regulating member, an adjusting member mounted for swinging movement about said control shaft, a clamping member releasably clamping said adjusting member in a selected position, and remote control connecting means supported by said adjusting member joined to said regulating member adapted to rotate said regulating member with respect to said control shaft.

7. In a governor the combination comprising a governor housing, a governor shaft extending within said housing driven by a prime mover to be governed, a rotatably mounted control shaft having an end within said housing cooperatively related to said governor shaft to be rotated in response to movement of said governor shaft and extending to the exterior of said housing, a bushing threadedly received in the wall of said housing supporting said shaft having a clamping surface movable toward and away from the housing upon rotation of the bushing, an adjustment member mounted on said bushing adapted to be releasably clamped between said clamping surface of said bushing and the wall of said housing, a regulating member mounted for rotation about the portion of said control shaft to the exterior of said housing, a torsion spring having one end cooperatively engaged with said control shaft and the other secured to said regulating member, and control means secured to said adjustment member cooperatively engageable with said regulating member for positioning said regulating member.

8. In a governor the combination comprising a governor shaft driven by a prime mover to be governed, a rotatably mounted control shaft cooperatively related to said governor shaft to be rotated in response to movement of said governor shaft, a regulating member encircling and rotatable with respect to said control shaft, a linkage arm mounted on said control shaft with a mounting portion turned back upon itself providing a pair of spaced protective webs through and between which said control shaft is passed for mounting said linkage arm, a helical torsion spring closely surrounding said control shaft disposed between said spaced protective webs having radially extending leg portions engaging said linkage arm and said regulating member to bias said control shaft against rotation in response to movement of said governor shaft.

9. In a governor the combination comprising a governor shaft driven by a prime mover to be governed, a rotatably mounted control shaft cooperatively related to said governor shaft to be rotated in response to movement of said governor shaft, a spring receiving arm mounted on said control shaft for movement therewith with a mounting portion turned back upon itself providing a pair of spaced webs through and between which is passed said control shaft and having a spring engaging portion radially outward on said shaft, a helical torsion spring closely surrounding said control shaft disposed between said webs of said guard having an anchorage end and having the other end engaged to said spring engaging portion of said arm to impart spring bias to said control shaft, and a mounting member securing the anchorage end of said spring.

10. In a governor the combination comprising a governor shaft, governor weights, a rotatably mounted control shaft to be rotated in response to movement of said weights, an arm extending radially outward from and rotatable with said control shaft, a regulating member in the form of a disc encircling said shaft and rotatable with respect thereto, said regulating member having a spring engaging portion at a substantial radial distance from said shaft, a helical spring encircling said shaft with one end extending radially outward to a connection with said arm and the other end extending radially outward to a connection with said spring engaging portion of said disc, and means for rotating said regulating member about said shaft to impart spring bias to said control shaft.

References Cited in the file of this patent

UNITED STATES PATENTS

| 1,442,885 | Hinkley | Jan. 23, 1923 |
| 1,758,569 | Folkerts et al. | May 13, 1930 |
| 2,250,982 | Adler | July 29, 1941 |

FOREIGN PATENTS

| 63,624 | Denmark | June 18, 1945 |